Patented Jan. 15, 1952

2,582,605

UNITED STATES PATENT OFFICE 2,582,605

CONDENSATION OF BETA-HYDROXYETHYL SULFIDES WITH COMPOUNDS CONTAINING HYDROXYL GROUPS

Frederick P. Richter, Woodbury, N. J., and Ebenezer E. Reid, Baltimore, Md., assignors to Socony-Vacuum Oil Company, Incorporated, a corporation of New York No Drawing. Application August 19, 1947, Serial No. 769,542

16 Claims. (Cl. 260—608)

This invention relates to new compositions of matter prepared by the reaction of compounds containing $\beta$-hydroxyethyl sulfide groups with compounds containing hydroxyl groups and also to the method of preparing these compositions.

This invention further relates to a new group of synthetic lubricants, a method of producing them, and a method of lubricating relatively moving surfaces by maintaining a film comprised essentially of said new lubricants between them.

A number of methods for preparing ethers have been described in the chemical literature, such as the classical Williams on Synthesis, the dehydration of alcohols over alumina (Senderns), the catalytic reduction of acetals, the addition of alkylene oxides to alcohols, the condensation of Grignard reagents with haloethers, etc. The commercial method of preparing ethyl ether by the dehydration of ethanol with sulfuric acid is well known. The mechanism of the reaction has been extensively studied [Chemical Abstracts, 30, 4148⁶ (1936)].

According to the present invention, it has been found that in the presence of acid catalysts, materials like thiodiglycol, which has unusually reactive hydroxyl groups, will readily condense with compounds containing hydroxyl groups to form mixed ethers. It has also been found that this condensation reaction is not peculiar to thiodiglycol but that it is general for all compounds containing an —S—CH$_2$CH$_2$OH group, namely, the $\beta$-hydroxyethyl sulfides.

The reaction products described above vary widely in characteristics, depending upon the starting materials and conditions of reaction, and only a small proportion of the total number of reaction products that may be formed in accordance therewith will be suitable for use as lubricants.

According to the present invention, it has been further discovered that by using the proper starting materials and controlling the conditions of reaction, a more specific group of reaction products may be prepared which have, as a predominant characteristic, an ability to act as highly effective synthetic lubricants.

Further, it has been found that a compound containing the —S—CH$_2$CH$_2$OH group will condense both with itself, and with compounds containing an hydroxyl group attached to alkyl, substituted alkyl, alicyclic, alicyclic alkyl, aryl, alkaryl, aralkyl, heterocyclic or heterocyclic alkyl groups including variously substituted forms thereof. It will be apparent to any one skilled in the art that compounds containing strongly basic groups or heterocyclic compounds containing basic substituent atoms such as nitrogen are to be excluded since such compounds would react with, and thus inactivate, the acid catalyst. In such cases, it is necessary to employ neutral or acid salts of the basic compounds either directly or as formed in situ since the successful practice of the invention requires that the reaction mixture be of an acidic nature.

Certain functional groups may interfere with the reaction, e. g., it is well known that nitro groups, being strongly electronegative, affect the normal course of many reactions. Accordingly, in the practice of the present invention, those skilled in the art normally will be cautious in predicting results in cases where nitro or similar groups are involved.

REACTANTS

The $\beta$-hydroxyethyl sulfide compound

Except for a relatively few compounds, such as those mentioned above, which contain groups or radicals, or structural configurations, that are inimical to the reaction of this invention, any chemical compound or mixture of chemical compounds containing $\beta$-hydroxyethyl sulfide groups can be reacted in accordance with the principles of this invention. A large number of representative compounds have already been tested and found operative. Compounds containing substituted $\beta$-hydroxyethyl groups such, for example, as those containing 2—hydroxypropyl sulfide or 2-hydroxyamyl sulfide groups are reactable according to the principles of this invention and may be considered to contain $\beta$-hydroxyethyl sulfide radicals for the purpose of this invention.

The $\beta$-hydroxyethyl sulfide compounds of this invention may include one or more than one $\beta$-hydroxyethyl sulfide group per molecule and the $\beta$-hydroxyethyl sulfide groups may be either $\beta$-hydroxyethyl monosulfides or $\beta$-hydroxyethyl di- or poly- sulfides. The monosulfides or disulfides, however, are preferred.

Preliminary experiments indicate that the corresponding $\beta$-mercaptoethyl sulfides may be used in place of $\beta$-hydroxyethyl sulfides and hence these may be considered to be within the broader scope of this invention.

Structurally, the $\beta$-hydroxyethyl sulfide group may be represented as follows:

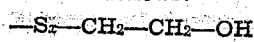

In this formula, $x$ represents any whole number, preferably one or two. Either or both of the $CH_2$ groups may have one or more of the hydrogen atoms replaced by an organic radical. The β-hydroxyethyl sulfide compound of this invention will normally comprise one or more β-hydroxyethyl sulfide groups attached to an organic residue that may generally be designated as R. Thus, we have:

$$R[-S_x-CH_2-CH_2-OH]_y$$

in which $y$ is any whole number. To the residue, R, there may be attached one or more hydroxy groups, one or more of any non-interfering substituents, or a mixture of hydroxy groups and non-interfering substituents.

The residue, R, may be a residue of either a saturated hydrocarbon or an unsaturated hydrocarbon or even a heterogeneous structure containing other elements than hydrogen and carbon. Thus, for example, the residue R may be alkyl, aryl, aralkly, alkaryl, heterocyclic, olefin, alicyclic, or any combination of these.

It may thus generally be stated that the β-hydroxyethyl sulfide compound may be any compound that contains one or more β-hydroxyethyl sulfide groups, except for a relatively small group of compounds that contain interfering substituents or structures inimical to the reaction of the present invention.

The preferred β-hydroxyethyl sulfide compounds of this invention may be represented by the following structural formula:

$$R[-S_x-CH_2-CH_2-OH]_y$$

in which $x$, preferably, is 1 or 2, $y$ is a whole number and R represents a residue selected from the following groups: alkyl, aryl, aralkyl, alkaryl, heterocyclic, heterocyclic alkyl, alicyclic, alicyclic alkyl; and in which any one of the above residues may have one or more hydroxy radicals attached thereto.

Thiodiglycol, $HOCH_2CH_2SCH_2CH_2OH$, has been found particularly well suited to this invention and hence may be considered a preferred specific compound. Of the thiodiglycols, two main classes thereof may be considered as preferred examples.

*Class 1.—Monothiodiglycols*

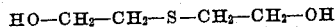
Di (2-hydroxyethyl) sulfide commonly referred to as thiodiglycol

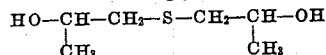
Di (2-hydroxypropyl) sulfide

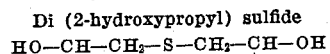
Di (2-hydroxybutyl) sulfide

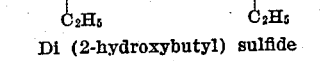
Di (2-hydroxyamyl) sulfide

*Class 2.—Dithiodiglycols*

The structure of the members of this species is the same as that of the species of Class 1, except that the sulfur linkage is a disulfide instead of monosulfide. Thus, the first member of Class 2 has the structure $HO-CH_2-CH_2-SS-CH_2-CH_2-OH$, dithiodiglycol When a synthetic lubricant is to be prepared, the primary reactant, in accordance with this invention is, preferably, thiodiglycol. Other similar compounds, such as dithiodiglycol or dithiotriglycol [di (hydroxyethylthio) ethylene] and the like can be used.

The group of compounds that can be used in accordance with this specific aspect of the present invention may be represented by the following structural formula:

$$R(S_xCH_2CH_2OH)_y$$

in which $x$ represents a small whole number, preferably one or two, $y$ represents a small whole number not greater than four, and R represents an organic residue, containing not more than eight carbon atoms and which may be another β-hydroxyethyl sulfide group, an aliphatic residue, an hydroxyaliphatic residue, an aryl residue, an hydroxyaryl residue, an alkyl aryl residue, or an hydroxyalkyl aryl residue.

*The hydroxy compound*

Since all of the β-hydroxyethyl sulfide compounds described above contain hydroxy groups, any one of these compounds can be caused to react with itself, or any two or more can be caused to react together. This is particularly true when the β-hydroxyethyl sulfide compound contains hydroxy groups attached to the residue as well as hydroxy groups occurring in the β-hydroxyethyl sulfide groups.

In most instances, however, it is desirable to react the β-hydroxyethyl sulfide compound with another hydroxy compound and often this other hydroxy compound will not fall within the β-hydroxyethyl sulfide compound group.

Thus, the β-hydroxyethyl sulfide compounds may be reacted with any organic hydroxy compound, except, as mentioned above in connection with the β-hydroxyethyl sulfide compound, a relatively few compounds that contain interfering substituents or structures inimical to the reaction. The hydroxy compounds may thus be designated generally by the formula:

$$R'[-OH]_x$$

in which R' is any organic residue, containing any non-interfering substituents, just as in the case of the residue in the β-hydroxyethyl sulfide compounds, and $x$ is a whole number.

The preferred hydroxy compounds may be represented by the following structural formula:

$$R'(OH)_y$$

in which $y$ is any whole number, and R' represents a residue selected from the following groups: alkyl, aryl, aralkyl, alkaryl, heterocyclic, heterocyclic alkyl, alicyclic and alicyclic alkyl.

Compounds containing primary or secondary hydroxyl groups, especially those containing from two to eight carbon atoms have been found especially well suited to the practice of this invention and hence may be considered to be a preferred class of hydroxy compounds.

As examples, the following compounds may be cited:

$HO-CH_2-CH_2-OH$, ethylene glycol.
$HO-CH_2-CH_2-CH_2-OH$, trimethylene glycol.
$HO-CH_2-CH_2-CH_2-CH_2-OH$, tetramethylene glycol.
$HO-CH_2-CH_2-CH_2-CH_2-CH_2-OH$, pentamethylene glycol.
$HO-CH_2-CH_2-CH_2-CH_2-CH_2-CH_2-OH$, hexamethylene glycol.
$HO-CH_2-CH_2-O-CH_2-CH_2-OH$, diethylene glycol.

HO-CH₂-CH₂-O-CH₂-CH₂-O-CH₂-CH₂-OH, triethylene glycol.

CH₃-CHOH-CH-OH, propylene glycol.

As with the β-hydroxyethyl sulfide compounds, it has been found that mercaptan groups can be substituted for hydroxy groups in the hydroxy compound and hence the use of the corresponding mercapto rather than hydroxy compounds is within the broader scope of this invention.

In preparing synthetic lubricants, the primary reactant will react with itself, in a condensation or polymerization reaction, to form reaction products of the desired characteristics but, unless prevented from doing so, will further react to form products of too high a molecular weight and too high a viscosity to be useful as lubricants. To prevent this, it has been found necessary in order to produce satisfactory synthetic lubricants, to add to the primary reactant a secondary reactant which will act to stop the condensation reaction or polymerization reaction when the desired molecular weight and viscosity has been attained.

This secondary reactant is desirably a monohydric organic compound of which isoamyl alcohol is a preferred example. Other monohydric alcohols, preferably primary or secondary, and containing not more than eighteen carbon atoms, may be used for this purpose as may also hydroxy aromatic compounds containing no more than eighteen carbon atoms. The monohydroxy organic compounds may be represented by the formula:

R'OH in which R' is preferably an aliphatic residue containing not less than four nor more than twelve carbon atoms, but may be any organic radical containing not more than eighteen carbon atoms and including residues that are in nature aliphatic, aralkyl, alkaryl, alicyclic, alicyclic aryl, or alkyl alicyclic. The residue R' shoud contain no substituent or structure that will react with the dithioglycol compound except for the single indicated hydroxy group.

A third reactant may also be desirably added in some instances or may be used in place of the secondary reactant. This reactant is preferably glycol, but may be any other di- or polyhydric alcohol, preferably a primary or secondary polyalcohol (polyol) containing not more than eight carbon atoms, or a di- or poly-hydroxy benzene or di- or poly-hydroxy cyclohexane.

Any of the three reactants may be used either in their pure or technical forms or in mixtures. The technical forms of these compounds are commonly mixtures having an average number of carbon atoms per molecule corresponding roughly to that of the corresponding pure compounds.

REACTION CONDITIONS

If the species or mixture of species selected for condensation or co-condensation is limited to thiodiglycols, the resulting polymer will have recurring sulfide or polysulfide linkages and ether oxygen linkages along the chain.

Glycols, as distinguished from thiodiglycols, do not readily condense to form chain polymers. It has, however, been found that any glycol or mixture of glycols can readily be co-condensed with a thiodiglycol or mixture of thiodiglycols. The reaction may be carried out in the same way that the condensation of thiodiglycols is effected; e. g. by heating with a condensing agent, and eliminating about one mol of water per mol of reactant present. Explanation of the observed phenomena is to be found in the high degree of activity of the hydroxyl groups of thiodiglycols, this activity being so high that water readily splits off between the activated hydroxyl groups of the thiodiglycols and the normally inactive hydroxyl groups of glycols that are not thiodiglycols.

In this condensation, the hydroxyl group of the thiodiglycol behaves, in the presence of normal glycol, like the hydroxyl of a carboxyl group and the activated hydroxyl group (of the thiodiglycol) combines with the hydrogen of the hydroxyl group of the ordinary glycol, the reaction thus being somewhat analogous to the union of the hydroxyl group of a carboxylic acid and the hydrogen of an alcohol (esterification). In a different environment, i. e., where all the glycol hydroxyl groups in the system are in the beta position in relation to a sulfur atom, for example where a thiodiglycol is condensed with itself or with another thiodiglycol, the hydroxyl groups have a hybrid character so that both hydrogen and hydroxyl are split off to form water.

In co-condensing a normal or ordinary glycol with a thiodiglycol, the molar ratio of the normal glycol to the thiodiglycol may vary over any desired range, preferably not exceeding, however, about two to one. The significance of that ratio will be apparent from the following equation:

HO—CH₂—CH₂—SS—CH₂—CH₂—OH +
    HO—R—OH→HO—R—O—CH₂—CH₂—
        SS—CH₂—CH₂—O—R—OH +2H₂O

Since in this case the glycol produced is itself one in which neither of the hydroxyl groups is in a beta position in relation to a sulfur atom the two to one ratio above mentioned is one that corresponds to minimum chain growth and said ratio marks a limit which should not be exceeded.

In general, where a glycol or mixture of glycols is co-condensed with a thiodiglycol or mixture of thiodiglycols, the ratio of the total number of mols of glycol to the total number of mols of thiodiglycol or thiodiglycols may vary between wide limits. For example, in practice, in order to obtain a compound of the type

HO—R—O—CH₂—CH₂—
            S—CH₂—CH₂—O—R—OH in good yields, at least ten mols of glycol to each mol of thiodiglycol are ordinarily employed. The excess glycol can be distilled out.

To accelerate the reaction, a condensing agent is employed, preferably a strong mineral acid, sulfuric acid being generally preferred.

In preparing synthetic lubricants, the relative proportions of the β-hydroxyethyl sulfide compound, the mono-hydroxy compound and the di- or poly-hydroxy compound, when used, should be adjusted to yield the desired characteristics in the lubricating composition, under the conditions of reaction. The proportions of reactants are more critical with regard to the final characteristics of the composition than are the reaction conditions, and hence the reaction conditions may be varied over a considerable range, without greatly affecting the final composition.

In general, it is desirable to use less than one molecular weight of the monohydroxy compound per molecular weight of the thiodiglycol compound. Preferably, between 0.7 and 0.9 of a molecular weight of the monohydroxy compound is used per molecular weight of the β-hydroxyethyl sulfide compound, which is, as has been said, preferably thiodiglycol. Desirable results can, however, be produced by using as low as 0.5 or as high as 1.2 of a molecular weight of the monohydroxy compound per molecular weight of the dithioglycol type compound.

Satisfactory synthetic lubricants can be prepared by condensing β-hydroxyethyl compounds, such as thiodiglycol, with poly-hydroxy compounds (polyols) in the absence of any monohydroxy compound, in which case it is necessary to use sufficient of the polyol to stop the reaction when the desired chain length has been attained. For this purpose about 0.5 to 2.0 mols of polyol should be used, per mol of thiodiglycol type compound.

The condensation is performed as described above, using an acid catalyst, preferably p-toluene sulfonic acid monohydrate. The monohydroxy compound is preferably added slowly to the thiodiglycol compound or to a mixture of the thiodiglycol compound and the polyhydroxy compound, if a polyhydroxy compound is used. The temperature is then raised slowly to between about 130° C. and about 200° C., preferably to between 175° C. and about 200° C., and maintained at that temperature until the reaction is complete. During the reaction, it is desirable to remove water formed by the reaction. This may be done in any convenient manner. The reaction will usually complete itself in from one to five hours. The product may then be purified by distillation under vacuum to remove the more volatile reaction products in known manner, if desired.

The reaction of this invention may be accomplished at an elevated temperature, suitably, within the range varying between about 130° C. and about 200° C. Within this range of temperature, the condensation reaction proceeds at a practicable rate for most alcohols including monohydric, dihydric and polyhydric alcohols, and most β-hydroxyethyl sulfides, and there is no appreciable thermal decomposition. More specifically, the range of temperatures varying between about 140° C. and about 160° C. is generally preferred, particularly when reacting relatively low molecular weight primary and secondary aliphatic alcohols with relatively low molecular weight β-hydroxyethyl sulfides. By relatively low molecular weight alcohols is meant alcohols containing not more than about eight carbon atoms per molecule and by relatively low molecular weight β-hydroxyethyl sulfides is meant β-hydroxyethyl sulfides containing not more than about eight carbon atoms per molecule.

It has been found that the reaction will take place, although very slowly, in the case of ethanol and thiodiglycol, at the reflux temperature, (about 78° C. to 80° C.). The rate of reaction increases rapidly as the temperature is raised and for this reason, a temperature range of about 140° C. to about 160° C. is preferred.

When polyhydric alcohols or higher molecular weight alcohols or β-hydroxyethyl sulfides containing a large number of carbon atoms are used, it has been found preferable to accomplish the reaction at a somewhat higher temperature, for example, about 175° C. to 200° C. It is generally preferred, however, to start the reaction at a temperature of about 140° C. to 160° C. and then raise the temperature gradually as the reaction proceeds.

When one of the reactants contains more than one hydroxyl group or more than one β-hydroxyethyl sulfide group, the reaction is somewhat more complex and the final compound may, and usually does, contain more than one group corresponding to at least one of the reactants involved.

The reaction apparently will not proceed satisfactorily in the absence of an acid catalyst. Sulfuric acid is an excellent catalyst for the reaction of this invention. It is preferred, however, to use catalysts which may be considered as derived from sulfuric acid such, for example, as the aryl sulfonic acids or the alkyl sulfonic acids. Specifically, p-toluenesulfonic acid is preferred because it is cheap, readily available and generally compatible with the reactants. Sulfuric acid, itself, has the disadvantage that it is frequently somewhat drastic in its action and when used at higher temperatures is apt to cause anomolous dehydration and charring.

Phosphoric acid is effective, although somewhat less so than sulfuric acid. On the other hand, it has less tendency to cause charring. Hydrochloric acid will promote the reaction, but is generally unsatisfactory since it forms chlorine derivatives with β-hydroxyethyl sulfides. Nitric acid is objectionable because it promotes oxidation of the organic material. Carboxylic acids undergo esterification with the alcohols and therefore lead to complications. Other strongly acidic organic bodies such as, for example, 2,4,6-trinitrophenol would probably promote the condensation, but such compounds are generally less readily available and more expensive than sulfuric acid or aryl sulfonic or alkyl sulfonic acids and present no advantages over the latter. Derivatives of sulfuric acid, such as the well known alkyl sulfuric acids, are within the scope of this invention.

In the case of sulfuric acid, alkyl sulfonic acids, and aryl sulfonic acids, it is preferred to employ about 0.016–0.064 mol of catalyst per mol of β-hydroxyethyl sulfide reactant. Generally, this ratio of catalyst will cause the reaction to proceed at a practicable rate. The reaction will proceed at much smaller catalyst concentrations, but generally not as rapidly as when a ratio falling within the preferred range is employed. Higher concentrations of catalyst may, of course, be employed but generally for practical purposes they are wasteful of the catalyst. It is within the scope of this invention, however, to employ any mol ratio of catalyst between 0.005 and 0.20 or even to employ amounts outside of this range.

When sulfuric acid is used, it is preferable to add it as an aqueous solution to avoid discoloration or charring, but this is not essential to the success of the condensation reaction.

When phosphoric acid is employed as the catalyst, it must be employed in a higher mol ratio than sulfuric acid or p-toluenesulfonic acid, for example. Usually 0.64 to 0.82 mol of phosphoric acid per mol of β-hydroxyethyl sulfide reactant is required. In general, phosphoric acid is less effective and less desirable as a catalyst than sulfuric acid or aryl sulfonic acids or alkyl sulfonic acids.

If a simple ether is to be prepared, it is generally preferable to use an excess of the hydroxyl group-containing reactant over the β-hydroxyethyl sulfide in those cases where the hydroxyl group-containing reactant can be recovered readily. In such instances, it is preferred to use the hydroxyl group-containing reactant in an excess of about 25% to 100% over the theoretical. In general, the normal alcohols having up to about twelve carbon atoms per molecule are readily recoverable.

When the compounds to be reacted contain more than one hydroxyl group or more than one β-hydroxyethyl sulfide group, the final product may be one that is derived from an indeterminative number of molecules of the reactants. For example, when a hydroxy-alkyl compound contains two hydroxyalkyl groups, or a dihydroxyalkyl group, e. g. CH₂OHCHOH—, it is possible for this compound to combine with the two β-hydroxyethyl sulfide groups, thus making the final compound one which is derived from three molecules of the original reactants. If the β-hydroxyethyl sulfide reactant contains two β-hydroxyethyl sulfide groups, the final compound may be derived from two molecules of the hydroxyalkyl compound and one molecule of the β-hydroxyethyl sulfide compound. If both of the reacting compounds contain a plurality of reactant groups, the final product may be derived from an indeterminate number of molecules of each of the reactants. This will be governed by the conditions of reaction, such as the temperature, the catalyst, the concentration of catalyst, the time of reaction, and the ratio and method of combining the reactants.

If the β-hydroxyethyl sulfide reactant contains two or more β-hydroxyethyl sulfide groups, it can react with itself to form a multimolecular condensation product, which appears in the final product.

In order to prevent the formation of considerable amounts of condensation products of the β-hydroxyethyl sulfide reactants, where the β-hydroxyethyl sulfide reactant contains more than one β-hydroxyethyl sulfide group, it is preferred to dissolve the catalyst either in a solvent, the hydroxyl group-containing reactant or the β-hydroxyethyl sulfide reactant, at room temperature, and add the solution to the remaining component or components at or about the reaction temperature.

The time required for practical completion of the condensation reaction depends upon the reactivity of the hydroxyl group-containing reactant, the reactivity of the β-hydroxyethyl sulfide reactant, the nature of the catalyst, the concentration of the catalyst, the method of removing water of reaction, and the temperature. The time required can generally be judged by the rate of evolution of water. In working with laboratory-sized quantities, i. e., 50 to 500 grams, the reaction can frequently be consummated in about one to one and a half hours, but with larger quantities, about three to five hours are generally required.

In accordance with the LeChatelier principle, it is desirable to remove one of the reaction products in order to cause the reaction to proceed to completion in the minimum time. The condensation reaction of hydroxyl group-containing reactant with β-hydroxyethyl sulfides can generally be brought to completion rapidly by providing effective means for removing the water formed by the reaction. This can be accomplished by distilling out the water, either alone or with one of the reactants, which is used in excess, during the reaction, or by distilling or blowing out the water with an inert gas, such as dry nitrogen, or by codistillation of the water with an inert solvent.

THEORY OF REACTION

The reaction may be generally represented, in the simplest case, as:

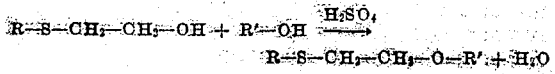

As the β-hydroxyethyl sulfide compound becomes R(—S—CH₂—CH₂—OH)$_y$, in which $y$ is more than one, and/or the hydroxy compound becomes R′(—OH)$_y$, in which $y$ is again more than one, the reaction becomes more complex and soon, as the $y$ values increase, the reaction becomes impossible to picture by structural formulas.

When the β-hydroxyethyl sulfide compound contains a plurality of β-hydroxyethyl sulfide radicals, the reaction may be represented as:

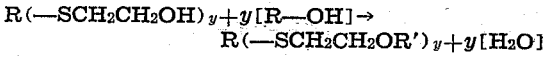

in which $y$ represents a whole number, which is greater than one.

When thiodiglycol is reacted with a monohydroxy compound, the reaction can be represented as:

This represents a rather special case in that the two β-hydroxyethyl groups are attached directly to the same sulfur atom. Thus, one of the β-hydroxyethyl groups can be considered to be the organic residue R and the sulfur together with the remaining β-hydroxyethyl group considered to be a β-hydroxyethyl sulfide radical. For all practical purposes, however, the compound contains two β-hydroxyethyl sulfide groups.

The reaction of para, di-β-hydroxyethyl thioether of benzene with a monohydroxy compound is a better example of reactions involving compounds containing a plurality of β-hydroxyethyl sulfide groups. Thus:

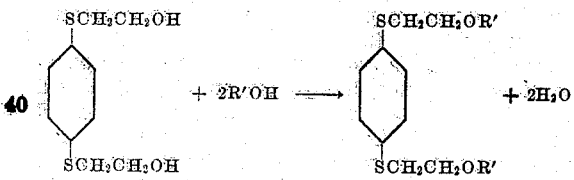

When the hydroxy compound contains a plurality of hydroxy radicals, the reaction may be represented as:

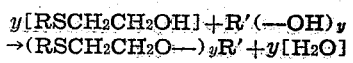

in which $y$ represents a whole number, which is greater than one. Thus, for example, when glycerol is reacted with a β-hydroxyethyl sulfide compound, in a molecular ratio of one to three, the product is believed to be represented by the following structural formula:

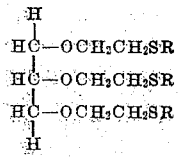

When a glycol is reacted with a β-hydroxyethyl sulfide compound in a molecular ratio of one to two, the following should be the formula:

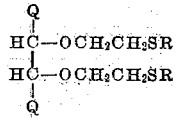

where Q is a hydrogen atom, or an alkyl group or a substituted alkyl group.

Where pentaerythritol is reacted with a β-hydroxyethyl sulfide compound in a molecular ratio of one to four, the following should be the structural formula of the product:

$$C(CH_2OCH_2CH_2SR)_4$$

Where such compounds as polyethylene glycol and polypropylene glycol are reacted with β-hydroxyethyl sulfide compounds in the molecular ratio of one to two, the structural formula of the product should be:

$$RSCH_2CH_2O(-TO-)_yCH_2CH_2SR$$

in which T represents a divalent aliphatic residue, such as $-CH_2-CH_2-$ or $$-CH-CH_2-$$
$$\phantom{-CH-}|$$
$$\phantom{-CH-}CH_3$$

and $y$ is a whole number greater than one.

Particularly when the β-hydroxyethyl sulfide compound contains one or more hydroxy radicals attached to the organic residue, the compound may be reacted with itself to form a condensation product of relatively high molecular weight. If there is but one β-ethyl sulfide group in the compound and but one hydroxy group on the organic residue, the product would probably be represented by the following structural formula:

$$HO-(-RSCH_2CH_2O-)_yH$$

wherein $y$ is a whole number.

As an example, when R is an hydroxyalkyl radical, the product may be represented as:

$$HO[(-CH_2)_zSCH_2CH_2-]_yH$$

in which $y$ and $z$ each represent whole numbers.

If there is more than one β-ethyl hydroxy sulfide group or more than one hydroxy group on the organic residue, or both, the structure of the condensation product would rapidly become too complex to picture.

Again, in a reaction between an hydroxy compound and a β-hydroxyethyl sulfide compound in which there are a number of β-hydroxyethyl sulfide groups in the β-hydroxyethyl sulfide compound and/or a number of hydroxy groups in the hydroxy compound, the structural formula of the product will rapidly become too complex to portray.

Further details and advantages of this invention may be understood by a consideration of the following specific examples:

EXAMPLE I

*The diisoamyl ether of thiodiglycol*

Materials: Parts by weight
Thiodiglycol _____ 122
Isoamyl alcohol (excess) _____ 352.5
p-Toluenesulfonic acid monohydrate
  (catalyst) _____ 12

The mixture above was placed in a reaction vessel equipped with a water takeoff and heated under reflux until no more water was formed (total water collected: 37 parts). After cooling, the reaction product was washed with 150 parts of 5% aqueous sodium carbonate and then with water until neutral. The mixture was subjected to fractional distillation under vacuum. The following fractions were collected:

| Fraction | Vapor Temp. | Pressure | Weight |
|---|---|---|---|
| | °C | Mm. mercury | Parts |
| I | 50–165 | 20 | 13 |
| II | 165–175 | 20 | 16 |
| III | 175–177 | 20 | 218 |
| Residue | 177 | 20 | 23 |

Fraction III consisted of a mobile, colorless, liquid possessing a mild odor, having an index of refraction of $(n_D^{20°})$ 1.4558 and a sulfur content of 12.6%. The diisoamyl ether of thiodiglycol should theoretically contain 12.2% sulfur. The yield of product boiling at 175–177° C./20 mm. is 83%.

This experiment was duplicated and essentially the same results were obtained using 12 parts of 6 N sulfuric acid as catalyst instead of 12 parts of p-toluene sulfonic acid monohydrate. In this instance, 45 parts of water were collected.

EXAMPLE II

*The di-n-tetradecylether of thiodiglycol*

Materials: Parts by weight
N-tetradecanol _____ 472
Thiodiglycol (commercial product redistilled) _____ 122
p-Toluenesulfonic acid monohydrate ___ 12

The mixture above was held at a temperature of 140° C. for four hours. On cooling, a solid cake formed which was digested with fifty parts of water, filtered and washed with water until free of the acid catalyst. The yield was practically theoretical. A portion was crystallized from aqueous isopropanol and melted at 53.5 to 54° C. Sulfur found: 6.65%, calculated for $$(C_{14}H_{29}OCH_2CH_2)_2S: 6.23\%$$

EXAMPLE III

Employing techniques similar to those described in Examples I and II all of the normal alkyl diethers of thiodiglycol were prepared from the butyl diether through octadecyl diether. The melting points and analyses are given in Table I as follows:

Melting points and analyses of $(ROCH_2CH_2)_2S$, where R is normal alkyl:

TABLE I

| R is— | M. P., °C. | Per Cent S (Calc.) | Per Cent S (Found) |
|---|---|---|---|
| $C_4H_9$— | −38.5 to −38 | 13.68 | 14.08 |
| $C_5H_{11}$— | −33.5 to −33 | 12.21 | 12.49 |
| $C_6H_{13}$— | −9.5 to −9 | 11.04 | 11.27 |
| $C_7H_{15}$— | −5.5 to −5 | 10.06 | 9.7 |
| $C_8H_{17}$— | 15 to 15.5 | 9.25 | 9.45 |
| $C_9H_{19}$— | 16.5 to 17 | 8.56 | 9.0 |
| $C_{10}H_{21}$— | 32 to 32.3 | 7.96 | 8.06 |
| $C_{11}H_{23}$— | 32 to 32.5 | 7.44 | 7.8 |
| $C_{12}H_{25}$— | 44 to 44.5 | 6.99 | 6.45 |
| $C_{13}H_{27}$— | 43.5 to 44 | 6.59 | 7.08 |
| $C_{14}H_{29}$— | 53.5 to 54 | 6.23 | 6.65 |
| $C_{15}H_{31}$— | 52.5 to 53 | 5.90 | 6.60 |
| $C_{16}H_{33}$— | 59.5 to 60.3 | 5.61 | 6.42 |
| $C_{17}H_{35}$— | 59.5 to 60 | 5.35 | 6.34 |
| $C_{18}H_{37}$— | 66 to 66.5 | 5.11 | 5.80 |

EXAMPLE IV

*β-Phenyl, β'-n-pentoxyethyl sulfide*

Materials: Parts by weight
β-Phenyl, β'-hydroxyethyl sulfide _____ 72.8
n-Amyl alcohol _____ 88.2
p-Toluene sulfonic acid monohydrate ___ 16.1

The above mixture was boiled under reflux, distilling off the water until the reaction was complete. The reaction product was dissolved in 400 parts of benzene, the benzene solution washed with 2% aqueous sodium carbonate and then with water until neutral to litmus. After drying and filtering the benzene was removed by distillation and the residue subjected to fractional distillation under vacuum. A fraction boiling at 142–148°/3 mm., 80 parts, was collected, consisting of a colorless, mobile liquid. A portion was further purified for analysis by redistillation and it had an index of refraction of $(n_D^{20})$ 1.5148.

The sulfur found was 13.1%; sulfur calculated for β-phenyl, β'-n-pentoxyethyl sulfide was 12.7%

VOLUME V n-Octyl, β-octoxyethyl sulfide

Three parts of p-toluenesulfonic acid monohydrate were dissolved in 76 parts of n-octyl, β-hydroxyethyl sulfide and the solution added dropwise in 20 minutes to 78 parts of n-octanol at a temperature of 155° C. This temperature was maintained for 40 minutes longer as the evolved water was blown out by a stream of dry nitrogen gas. At 100° C., 2 parts of barium carbonate were stirred into the reaction mixture. The neutralized product was then passed through a filtering clay and the clear filtrate fractionated through a 16 cm. indented glass column. A total of 100 parts of a fraction boiling at 170–171° C. at 1.7 mm. was collected, representing 83% yield. It consisted of a colorless mobile liquid having an index of refraction of ($n_D^{20}$) 1.4616; sulfur found 11.15%, calculated for $C_8H_{17}OCH_2CH_2SC_8H_{17}$ sulfur, 10.6%.

EXAMPLE VI

Pinyl, β-isoamoxyethyl sulfide

A solution of 6 parts of p-toluene sulfonic acid monohydrate in 107 parts of pinyl, β-hydroxyethyl sulfide (prepared by the addition of mercaptoethanol to β-pinene) was added dropwise over a period of 45 minutes to 132 parts of isoamyl alcohol at normal reflux temperature (133° C.). At the end of this time 6–7 parts of water had been collected. In the next hour the water layer increased to 8.5 parts and after one more hour of refluxing, the theoretical amount or 9 parts of water had been collected.

The reaction product was washed with 100 parts of 5% aqueous sodium carbonate and then three times with 100 parts of water each. The excess alcohol was distilled off and the residue fractionated in vacuo. A fraction weighing 69 parts and representing a 49% yield was collected. It boiled constantly at 136° C. at 0.8 mm., index of refraction ($n_D^{20}$) 1.4906. Calculated for $C_{10}H_{17}SCH_2CH_2OC_5H_{11}$: S=11.3%. Found: S=11.8%.

EXAMPLE VII

β,β'-di-n-propoxyethyl sulfide

In the case of the lower boiling alcohols, it is advisable to carry out the condensation reaction under pressure. In general, the yields are somewhat lower and side reactions are encountered, chiefly the formation of thioxane and linear polymeric thiodiglycol in the case of condensations involving thiodiglycol. The following example is illustrative:

A mixture consisting of:                 Parts by weight n-Propanol _____ 270.3
Thiodiglycol _____ 183.3
p-Toluenesulfonic acid monohydrate__ 18.3 was heated in a stainless steel bomb at a temperature of 140–145° C. for 3½ hours. The cooled reaction product was dissolved in benzene, washed with aqueous sodium carbonate and water until neutral, the benzene distilled off and the residue fractionated in vacuo. There was thus obtained 160 parts of a fraction boiling at 75–81° C. at 0.4 mm., representing a yield of 51%. The purified compound had a boiling point of 156–157° C. at 43 mm., melting point −48° C., index of refraction ($n_D^{20}$) 1.4596, per cent sulfur, 15.71. The calculated percentage of sulfur for the di-n-propyl ether of thiodiglycol is 15.54%.

There was also obtained 46 parts of a fraction boiling at 81–160° C. at 0.4 mm. This yielded on refractionation, 25 parts of a compound boiling at 228–230° F. at 20 mm.; index of refraction ($n_D^{20}$) 1.4898; per cent sulfur, 21.4%; molecular weight, 310.5; density, 1.0226; indicating that the compound was $(C_3H_7OCH_2CH_2SCH_2CH_2)_2O$ calculated molecular weight=310.2; calculated per cent sulfur=20.7, or the di-n-propyl ether of the dimer of thiodiglycol, $(HOCH_2CH_2SCH_2CH_2)_2O$

EXAMPLE VIII

Condensation of β-hydroxyethyl octyl sulfide with pentaerythritol $C(CH_2OH)_4 + 4C_8H_{17}SCH_2CH_2OH \rightarrow$
$\qquad C(CH_2OCH_2CH_2SC_8H_{17})_4 + 4H_2O$ To a mixture consisting of 13.5 parts of pentaerythritol and 76 parts of β-hydroxyethyl-octylsulfide was added 2.5 parts of p-toluene sulfonic acid monohydrate at a temperature of 150° C. Water was evolved at once and the reaction was complete within 45 minutes at 150–160° C. The product was neutralized by adding 1.5 parts of barium carbonate. The filtrate was heated to 170° C. under a vacuum of 1.3 mm., leaving an oily residue consisting of 78 parts and containing 15.4% sulfur;

$C(CH_2OCH_2CH_2SC_8H_{17})_4$ requires S=15.5%

EXAMPLE IX

This example illustrates the case where R is aryl.

Bis-(β-phenoxyethyl) sulfide $S(CH_2CH_2OH)_2 + 2C_6H_5OH \rightarrow$
$\qquad S(CH_2CH_2OC_6H_5)_2 + 2H_2O$ A solution of 12 parts of p-toluene sulfonic acid monohydrate in 122 parts of thiodiglycol was added dropwise to a mixture of 188 parts of phenol and 200 volumes of xylene. The addition was made at the reflux temperature and extended over a period of about one hour. The mixture was heated under reflux at normal pressure for an additional hour and during the total period 35 parts of water were collected.

The xylene solution was washed with 3% aqueous sodium hydroxide and then with water until neutral. The organic layer was dried, filtered, stripped of solvent and the residue distilled in vacuo. The fraction boiling at 182–185° C./0.9 mm. consisted of 110 parts. After recrystallization from ethanol it melted at 54.3–54.4° C. and contained 11.8% sulfur;

$S(CH_2CH_2OC_6H_5)_2$ requires S=11.7%

The preparation of bis-β-phenoxyethylsulfide by the condensation of sodium phenolate with β,β'dichloroethylsulfide was reported by Helfrich and Reid, Jour. Am. Chem. Soc. 42, 1218 (1920) and the melting point was given (loc. cit.) as 54.2° C.

EXAMPLE X

This example further illustrates the case where R is aryl.

β-Phenyl, β'-phenoxyethyl sulfide

To a refluxing solution consisting of 47 g. of phenol and 91 g. of β-phenyl, β'-hydroxyethyl sulfide in 150 cc. of xylene was added 3 g. of p-toluene sulfonic acid monohydrate. After 2 hours at the reflux temperature, a total of 6 g. of water had been distilled from the mixture.

The xylene solution was neutralized with barium carbonate, filtered, and fractionally distilled. The yield of product boiling at 169–173° C./1.0 mm. was 80 g. at 0.9 mm., B. P. 165–169° C. and had $(n_D^{20})=1.5824$; found, S=12.9% calculated for β-phenyl, β'-phenoxyethyl sulfide, S=12.4%.

EXAMPLE XI

This example illustrates the case where R' is aryl.

β-Isoamyloxyethyl-phenylsulfide

A solution of 67 parts of β-hydroxyethyl-phenylsulfide in 150 parts (excess) isoamyl alcohol was heated to boiling and 3 parts of p-toluene sulfonic acid monohydrate were added. After 2.5 hours 3 parts of catalyst were again added and after 10 hours refluxing this process was repeated. At the end of 12 hours the theoretical amount of water had been collected.

The reaction product was neutralized with 2–3 parts of barium carbonate, filtered and fractionally distilled. There was thus obtained 72 parts of a fraction boiling at 146–150° C. for 7 mm. It has $(n_D^{20})=1.5222$; sulfur found, 14.3%; calculated for $C_6H_5SCH_2CH_2OC_5H_{11}$, sulfur= 14.3%.

EXAMPLE XII

This example illustrates the case where R is an alkylheterocyclicalkyl group.

n-Octyl, β[5-tert.-butyl thienyl-2-β-ethoxy]ethyl sulfide

At a temperature of 150° C., 0.3 g. of p-toluene sulfonic acid monohydrate was added to a mixture consisting of 9.0 g. of β-hydroxyethyl-n-octylsulfide and 9.7 g. of 2-(β-hydroxy-ethyl-5-tert.-butyl thiophene). The mixture was sparged with dry nitrogen gas for 0.5 hour at a temperature of 150–165° C. in order to remove the water formed in the reaction. After treatment with 2 g. of barium hydroxide and filtering the product was distilled. There was thus obtained 7 g. of a fraction boiling at 192–198° C./1.5 mm. having $(n_D^{20})=1.5008$; sulfur found=17.7%; sulfur calculated for $C_4H_9C_4H_2SCH_2CH_2OCH_2CH_2SC_8H_{17}$ =18.0%.

EXAMPLE XIII

Bis-(tetrahydrofurfuryloxy) ethylsulfide

A solution of 6 g. of p-toluene sulfonic acid monohydrate in 61 g. of thiodiglycol was added dropwise to 204 g. of tetrahydrofurfuryl alcohol at 155° C. The water of the reaction was removed by codistilling with xylene. After 16 hours a total of 18 g. of water had been removed.

The xylene solution of the product was washed with dilute aqueous sodium carbonate and then with water until neutral, dried, filtered and fractionally distilled. The fraction boiling at 162–163° C./0.8 mm. weighed 40 g. and had $(n_D^{20})=1.4935$, sulfur found=11.0%, sulfur calculated for $S(CH_2CH_2OCH_2C_4H_7O)_2=11.0\%$

EXAMPLE XIV

Polymerization of pentaerythritol with thiodiglycol

To the clear solution obtained by heating 68 parts of pentaerythritol with 366 parts of thiodiglycol was added 12 parts of p-toluene sulfonic acid monohydrate at a temperature of 145° C. After 25 minutes, the reaction was stopped when a total of 38 parts of water had been collected.

The product was neutralized with 6 parts of barium carbonate and filtered while hot. The filtrate, a pale yellow viscous liquid, was then heated under vacuum to 190° C. at 0.5 mm. There was thus obtained 300 parts of a clear, porous, spongy, gelatinous resin containing 24.3% sulfur. The resin product was insoluble in most of the common solvents such as ethanol, chloroform, dioxane, benzene, acetone, etc.

EXAMPLE XV

Di-n-amyl ether of dithiodiglycol

A solution consisting of 12 parts of p-toluene sulfonic acid monohydrate in 154 parts of a techical grade of dithiodiglycol at room temperature was added slowly during one hour to 352 parts (excess) of n-amyl alcohol at the temperature of reflux (138° C.) At the end of the reaction, 41.5 parts of water had been collected. The reaction product was washed once with 5% aqueous sodium carbonate and three times with water to remove the catalyst. After distilling off the excess alcohol, 80 parts of a fraction boiling at 120–140° C./0.3–0.7 mm. were collected. This product contained 19.1% sulfur.

EXAMPLE XVI

Copolymerization of thiodiglycol and ethylene glycol in the presence of isoamyl alcohol A solution of 18 parts of p-toluene sulfonic acid monohydrate in 220 parts by weight of isoamyl alcohol was added, over a period of one hour to a mixture of 365 parts by weight of thiodiglycol and 124 parts by weight of ethylene glycol. In the next 4–5 hours, the temperature was raised to 190° C. and 95 parts of aqueous distillate were collected. The reaction product was washed with dilute aqueous sodium carbonate and water until neutral. The product was then topped to a temperature of 225 C. at 0.5 mm. pressure. The residue consisted of 281 parts of the desired reaction product. It has the following properties: index of refraction $(n_D^{20})=1.5028$; sulfur 19.6%; kinematic viscosity at 100° F.=53.1 centistokes; at 210° F., 10.33 centistokes; viscosity index 151.5; ASTM slope= 0.564 and ASTM pour point=−5° F.

EXAMPLE XVII

Homocopolymerization of thiodiglycol in the presence of isoamyl alcohol

The purpose of the alcohol in this, as in the previous example, is to stop the polymerization at such a stage as will yield a product of desired viscosity. The alcohol being monofunctional apparently stops the polymerization by condensing with the hydroxyl of a β-hydroxyethyl group.

A solution of 18 parts of p-toluene sulfonic acid in 220 parts of isoamyl alcohol was added to 366 parts of thiodiglycol at a temperature of 140° C. The temperature was raised to 175° C. during the next four hours, during which time 72 parts of water were collected. After washing with dilute aqueous sodium carbonate and water, the excess alcohol was distilled off and the residue was topped to a temperature of 210° C. at 0.5 mm. pressure. An oil (199 parts) was thus obtained. It had the following properties: index of refraction $(n_D^{20})=1.4998$; sulfur, 21.4%; kinematic viscosity at 100° F. 20.41 centistokes, at 210° F., 4.87 centistokes; viscosity index, 171.5; ASTM slope, 0.643; ASTM pour point, −10° F.

EXAMPLE XVIII

When the condensation products of alcohols and β-hydroxy-ethyl sulfides are intended for use as lubricating oils of relatively high viscosity, it is desirable to add a di- or poly-hydric alcohol to the reaction mixture thus forming a polyether in situ. In general, the condensation technique is the same as described in previous examples. The viscosity of the resulting oil may be varied by varying the ratio of di- or polyhydric alcohol to monohydric alcohol; i. e., by varying the ratio of polymeric ether. The effect is illustrated in Table II which includes typical mixed ethers:

*Effect of adding dihydric alcohols on the viscosity characteristics of the resulting oil product*

TABLE II

| Ether | Kinematic Viscosity at— | | V. I. | Pour Point |
|---|---|---|---|---|
| | 100° F. | 210° F. | | |
| Di-2-ethylhexylthiodiglycol | 5.69 | 1.85 | 119 | |
| Mixed diethyleneglycol-2-ethylhexylthiodiglycol | 40.48 | 8.23 | 154 | <−30° F. |
| Mixed triethyleneglycol-2-ethylhexylthiodiglycol | 82.4 | 14.89 | 147 | <−30° F. |

It will be observed that the introduction of a poly-hydric alcohol so as to produce some polymeric ether in situ has greatly increased the viscosity and substantially increased the viscosity index. The ratio of di- or poly-hydric alcohol may be varied over wide limits to produce oils of any desired viscosity.

Reaction products produced in accordance with the general principles illustrated in Examples XVI, XVII, and XVIII vary considerably in their properties, but are all characterized by their ability to lubricate relatively moving surfaces. Furthermore, these products are, in general, highly stable, of low pour point, and of high viscosity index. Still further, they are compatible with other lubricating oils, both natural and synthetic, and can be readily blended with such oils to produce compounded lubricants of any desired characteristics. The addition agents commonly used with mineral lubricating oils, in general, function similarly with the synthetic oils of this invention.

Attempts to condense 2-nitrophenol, 4-nitrophenol, and 2-nitro-2-methylhexanol-3 with typical β-hydroxyethyl sulfides yielded only negative results. In these cases R is respectively the 2-nitrophenyl, 4-nitrophenyl and 1-dimethylnitromethylbutyl group.

The broader class of new compositions prepared according to this invention are useful for a wide variety of purposes, for example, as intermediates for the preparation of dyes, medicinals and other chemicals, as insecticides and insecticide carriers, as rust-inhibiting agents, as ingredients in paints, oils and lubricating compositions, and as synthetic resins or ingredients therein.

We claim:

1. A process which comprises contacting an organic compound containing at least one hydroxy group which is beta to a sulfur atom and not more than two adjacent sulfur atoms, which is free of substituent groups that are more reactive than said hydroxy group which is beta to a sulfur atom with respect to the hydroxy radical referred to hereinafter, with an organic compound containing at least one hydroxy radical, which is free of a hydroxy group which is beta to a sulfur atom and of substituent groups that are more reactive than said hydroxy radical with respect to said hydroxy group which is beta to a sulfur atom, in proportions falling within the range varying between about 0.5 mole and about 10 moles of said organic compound which is free of a hydroxy group which is beta to a sulfur atom to one mole of said organic compound containing at least one hydroxy group which is beta to a sulfur atom, in the presence of a dehydration catalyst, and at a temperature varying between about 130° C. and about 200° C.

2. A process which comprises contacting an organic compound containing at least one hydroxy group which is beta to a sulfur atom and not more than two adjacent sulfur atoms, which is free of substituent groups that are more reactive than said hydroxy group which is beta to a sulfur atom with respect to the hydroxy radical of the alcohol referred to hereinafter, with a monohydroxy alcohol in which the hydroxy group is not beta to a sulfur atom and which is free of substituent groups that are more reactive than the hydroxy radical of the alcohol with respect to said hydroxy group which is beta to a sulfur atom, in proportions falling within the range varying between about 0.5 mole and about 10 moles of said monohydroxy alcohol to one mole of said organic compound containing at least one hydroxy group which is beta to a sulfur atom, in the presence of a dehydration catalyst, and at a temperature varying between about 130° C. and about 200° C.

3. A reaction product prepared in accordance with the process of claim 2.

4. A process which comprises contacting an organic compound containing at least one hydroxy group which is beta to a sulfur atom and not more than two adjacent sulfur atoms, which is free of substituent groups that are more reactive than said hydroxy group which is beta to a sulfur atom with respect to the hydroxy radicals of the glycol referred to hereinafter, with a glycol which is free of a hydroxy group which is beta to a sulfur atom and of substituent groups that are more reactive than the hydroxy radicals of the glycol with respect to said hydroxy group which is beta to a sulfur atom, in proportions falling within the range varying between about 0.5 mole and about 10 moles of said glycol to one more of said organic compound containing at least one hydroxy group which is beta to a sulfur atom, in the presence of a dehydration catalyst, and at a temperature varying between about 130° C. and about 200° C.

5. A process which comprises contacting an organic compound containing at least one hydroxy group which is beta to a sulfur atom and not more than two adjacent sulfur atoms, which is free of substituent groups that are more reactive than said hydroxy group which is beta to a sulfur atom with respect to the hydroxy radicals of the organic compound and of the alcohol referred to hereinafter, with an organic compound containing at least one hydroxy radical, which is free of a hydroxy group which is beta to a sulfur atom and of substituent groups that are more reactive than the hydroxy radical with respect to said hydroxy group which is beta to a sulfur atom, and with an alcohol containing at least two hydroxy radicals and which is free of substituent groups that are more reactive than the hydroxy radicals of the alcohol with respect to said hydroxy group which is beta to a sulfur atom, in proportions falling within the range varying between about 0.5 mole and about 10 moles of said organic compound which is free of a hydroxy group which is beta to a sulfur atom to between about 0.5 mole and about 2 moles of said alcohol to one mole of said organic compound containing at least one hydroxy group which is beta to a sulfur atom, in the presence of a dehydration catalyst, and at a temperature varying between about 130° C. and about 200° C.

6. A reaction product prepared in accordance with the process of claim 5.

7. A process which comprises contacting a thiodiglycol which is free of substituent groups that are more reactive than the hydroxy group of the thiodiglycol which is beta to a sulfur atom with respect to the hydroxy radical referred to hereinafter, with an organic compound containing at least one hydroxy radical, which is free of a hydroxy group which is beta to a sulfur atom and of substituent groups that are more reactive than said hydroxy radical with respect to said hydroxy group which is beta to a sulfur atom, in proportions falling within the range varying between about 0.5 mole and about 10 moles of said organic compound which is free of a hydroxy group which is beta to a sulfur atom to one mole of said thiodiglycol, in the presence of an aryl sulfonic acid dehydration catalyst, and at a temperature varying between about 130° C. and about 200° C.

8. A process which comprises contacting a thiodiglycol which is free of substituent groups that are more reactive than the hydroxy group of the thiodiglycol which is beta to a sulfur atom with respect to the hydroxy radical of the alcohol referred to hereinafter, with a monohydroxy alcohol in which the hydroxy group is not beta to a sulfur atom and which is free of substituent groups that are more reactive than the hydroxy radical of the alcohol with respect to said hydroxy group which is beta to a sulfur atom, in proportions falling within the range varying between about 0.5 mole and about 10 moles of said monohydroxy alcohol to one mole of thiodiglycol, in the presence of an aryl sulfonic acid dehydration catalyst, and at a temperature varying between about 130° C. and about 200° C.

9. A reaction product prepared in accordance with the process of claim 8.

10. A process which comprises contacting a thiodiglycol which is free of substituent groups that are more reactive than the hydroxy group of the thiodiglycol which is beta to a sulfur atom with respect to the hydroxy radicals of the glycol referred to hereinafter, with a glycol which is free of a hydroxy group which is beta to a sulfur atom and of substituent groups that are more reactive than the hydroxy radicals of the glycol with respect to said hydroxy group which is beta to a sulfur atom, in proportions falling within the range varying between about 0.5 mole and about 10 moles of said glycol to one mole of said thiodiglycol, in the presence of an aryl sulfonic acid dehydration catalyst, and at a temperature varying between about 130° C. and about 200° C.

11. A process which comprises contacting thiodiglycol with an organic compound containing at least one hydroxy radical, which is free of a hydroxy group which is beta to a sulfur atom and of substituent groups that are more reactive than said hydroxy radical with respect to the hydroxy groups of said thiodiglycol, in proportions falling within the range varying between about 0.5 mole and about 10 moles of said organic compound which is free of a hydroxy group which is beta to a sulfur atom to one mole of said thiodiglycol, in the presence of an aryl sulfonic acid dehydration catalyst, and at a temperature varying between about 130° C. and about 200° C.

12. A process which comprises contacting thiodiglycol with a primary, paraffinic, monohydroxy alcohol containing at least four and up to eighteen carbon atoms per molecule, in which the hydroxy group is not beta to a sulfur atom and which is free of substituent groups that are more reactive than the hydroxy radical of the alcohol with respect to the hydroxy groups of said thiodiglycol, in proportions falling within the range varying between about 0.5 mole and about 10 moles of said alcohol to one mole of said thiodiglycol, in the presence of an aryl sulfonic acid dehydration catalyst, and at a temperature varying between about 130° C. and about 200° C.

13. A reaction product prepared in accordance with the process of claim 12.

14. A process which comprises contacting thiodiglycol with a glycol containing from two to eight carbon atoms per molecule, which is free of a hydroxy group which is beta to a sufur atom and of substituent groups that are more reactive than the hydroxy radicals of the glycol with respect to the hydroxy groups of said thiodiglycol, in proportions falling within the range varying between about 0.5 mole and about 10 moles of said glycol to one mole of said thiodiglycol, in the presence of an aryl sulfonic acid dehydration catalyst, and at a temperature varying between about 130° C. and about 200° C.

15. A process which comprises contacting thiodiglycol with a glycol which is free of a hydroxy group which is beta to a sulfur atom and of substituent groups that are more reactive than the hydroxy radicals of the glycol with respect to the hydroxy groups of said thiodiglycol, and with a monohydroxy alcohol which is free of substituent groups that are more reactive than the hydroxy radical of the alcohol with respect to the hydroxy groups of said thiodiglycol, in proportions falling within the range varying between about 0.5 mole and about 10 moles of said glycol to between about 0.5 mole and about 2 moles of said monohydroxy alcohol to one mole of said thiodiglycol, in the presence of an aryl sulfonic acid dehydration catalyst, and at a temperature varying between about 130° C. and about 200° C.

16. A reaction product prepared in accordance with the process of claim 15.

FREDERICK P. RICHTER.
EBENEZER E. REID.

REFERENCES CITED

The following references are of record in the file of this patent:

UNITED STATES PATENTS

| Number | Name | Date |
|---|---|---|
| 2,073,589 | Reppe et al. | Mar. 9, 1937 |
| 2,111,260 | Brunner | Mar. 15, 1938 |
| 2,332,869 | Okita | Oct. 26, 1943 |
| 2,378,576 | Okita | June 19, 1945 |
| 2,402,878 | Doumani | June 25, 1946 |
| 2,518,245 | Morris et al. | Aug. 8, 1950 |

FOREIGN PATENTS

| Number | Country | Date |
|---|---|---|
| 192,448 | Switzerland | Nov. 1, 1937 |

OTHER REFERENCES

Beilstein, vol. I, 2nd suppl. (1941), page 526.